United States Patent
Kvassnes et al.

(10) Patent No.: US 10,774,001 B2
(45) Date of Patent: Sep. 15, 2020

(54) COMPOSITION OF A CEMENT ADDITIVE MATERIAL AS AN ADDITIVE TO CEMENTITIOUS MINERAL ADMIXTURES, AND UTILISED AS LATENT HYDRAULIC BINDERS TO IMPROVE THE OUTCOME OF CEMENTITIOUS PRODUCTS

(71) Applicant: RESTONE AS, Fyllingsdalen (NO)

(72) Inventors: Astri Kvassnes, Hjellestad (NO); Jill Angelique Clausen, Fyllingsdalen (NO)

(73) Assignee: RESTONE AS, Fyllingsdalen (NO)

( * ) Notice: Subject to any disclaimer, the term of this patent is extended or adjusted under 35 U.S.C. 154(b) by 0 days.

(21) Appl. No.: 16/700,060

(22) Filed: Dec. 2, 2019

(65) Prior Publication Data

US 2020/0115283 A1  Apr. 16, 2020

Related U.S. Application Data

(63) Continuation of application No. PCT/NO2018/050238, filed on Oct. 3, 2018.

(30) Foreign Application Priority Data

Oct. 11, 2017 (NO) .................................. 20171617
Sep. 28, 2018 (NO) .................................. 20181267

(51) Int. Cl.
| | | |
|---|---|---|
| *C04B 28/24* | (2006.01) | |
| *C04B 22/06* | (2006.01) | |
| *C04B 22/14* | (2006.01) | |
| *C04B 111/20* | (2006.01) | |

(52) U.S. Cl.
CPC .............. *C04B 28/24* (2013.01); *C04B 22/06* (2013.01); *C04B 22/14* (2013.01); *C04B 2111/20* (2013.01); *C04B 2111/2092* (2013.01)

(58) Field of Classification Search
CPC ......... C04B 22/06; C04B 22/14; C04B 28/24; C04B 2111/20; C04B 2111/2092
See application file for complete search history.

(56) References Cited

U.S. PATENT DOCUMENTS

| 3,844,351 A | * | 10/1974 | Sutton ..................... C04B 28/04 166/293 |
| 2012/0137931 A1 | | 6/2012 | Chattopadhyay |
| 2012/0167803 A1 | * | 7/2012 | Luo ....................... C04B 18/021 106/672 |

FOREIGN PATENT DOCUMENTS

| CN | 101462852 A | * | 6/2009 | ............ C04B 18/08 |
| CN | 105218031 A | | 1/2016 | |
| EP | 2246315 A1 | | 11/2010 | |
| FR | 2939429 A1 | | 6/2010 | |
| JP | H11199302 A | | 7/1999 | |
| JP | 2010235400 A | | 10/2010 | |

OTHER PUBLICATIONS

NO20171617 Office Action, Patent Varemerke Design, Patentstyret, dated May 8, 2018, Realitetsuttalelse i patentsøknad nr. 20171617.
NO20171617 Norwegian Search Report, Patent Varemerke Design, Patentstyret, Norsk Granskingsrapport, Rapport utferdiget / dated May 8, 2018 av/by Ragnar Bårdsgård.
NO20181267 Office Action, Patent Varemerke Design, Patentstyret, dated Jun. 18, 2019, Realitetsuttalelse i patentsøknad nr. 20181267.
NO20181267 Norwegian Search Report, Patent Varemerke Design, Patentstyret, Rapport utferdiget / dated Jun. 18, 2019 av/by Ragnar Bårdsgård.
International Search Report, PCT/NO2018/050238, dated Nov. 2, 2019.
XP-002696925, High-Temperature Fire Resistance for Concrete Using Sustainable Building, Kilincarslan et al.
Written Opinion of the International Searching Authority, PCT/NO2018/050238, Form PCT/ISA/237 (dated Jan. 2015).
Written Opinion of the International Searching Authority (Separate Sheet), PCT/NO2018/050238, Form PCT/ISA/237 (Separate Sheet) (EPO—dated Apr. 2005).
Patent Cooperation Treaty, Written Opinion of the International Preliminary Examining Authority, dated Feb. 8, 2019, PCT/NO2018/050238, Applicant: Restone AS.

* cited by examiner

*Primary Examiner* — Anthony J Green
(74) *Attorney, Agent, or Firm* — Flener IP & Business Law; Zareefa B. Flener (57) ABSTRACT

A composition of a cement additive material to improve durability of cementitious structures, was disclosed. The cement additive composition includes an admixture of one or more of divalent magnesium metal silicates with capacity to act as a latent hydraulic binder in said composition activated by a hydration process under aqueous conditions, and in particular the divalent metal silicate is magnesium-dominated silicate, preferably comprising mineral groups of olivines, orthopyroxenes, amphiboles, talc and serpentines or mixtures thereof. The composition also includes chloride ions or brine. Applications of the compositions are also disclosed, in particular to utilize a property of hydration as a major trigger for the latent hydraulic reaction of magnesium silicates, particularly for said olivines, when exposed to water and brines, in order to obtain a cementitious material becoming self healing.

14 Claims, 4 Drawing Sheets

COMPOSITION OF A CEMENT ADDITIVE MATERIAL AS AN ADDITIVE TO CEMENTITIOUS MINERAL ADMIXTURES, AND UTILISED AS LATENT HYDRAULIC BINDERS TO IMPROVE THE OUTCOME OF CEMENTITIOUS PRODUCTS

CROSS REFERENCE TO RELATED APPLICATIONS

This application is a continuation of pending International Patent Application No. PCT/NO2018/050238, filed on Oct. 3, 2018, which claims the benefits of Norwegian Patent Application No. NO20171617 (filed Oct. 11, 2017) and Norwegian Patent Application No. NO20181267 (filed Sep. 28, 2018). The entire contents of these aforementioned applications are hereby incorporated by reference.

FIELD OF THE INVENTION

The present invention concerns a composition of a cement additive material to improve durability of cementitious structures.

More specific, the present invention relates to products made from cementitious mineral admixtures. The mixtures will include a cement additive product, a new ingredient, purposed as a latent hydraulic binder for cementitious mineral admixtures, mortars and concrete structures for industrial applications and for construction purposes. The utilized ingredient will increase the durability of the product over its whole lifetime, and when in contact with external humid, wet or submerged aquatic environment.

BACKGROUND

The present invention relates to the field of cementitious materials such as Portland Cement and geopolymers. The purpose of the invention is to apply divalent magnesium-iron solid solution silicates (for example the mineral groups olivine, orthopyroxene, amphibole, talc and serpentine), here called "magnesium silicates", as latent hydraulic binders for cementitious mineral admixtures, thereby increasing the integrity, volume, weathering and/or lifetime of the cementitious mineral admixture structure.

The invention relates the integrity- and/or durability enhancement of cementitious structures over time by including/adding magnesium silicates in cementitious mineral admixtures as a latent hydraulic binder, and to increase its capacity to handle weathering and exposure to flow of water mixtures on and through the cementitious materials.

Ordinary well cement is based on the principles of Portland Cement. As NORSOK D010 and API Spec 10A are the current industrial standards for operations in the oil and gas industry, it was important that that the present invention is able to meet those standards in an affordable manner. Of particular advantage of the present invention is that it easily added to current well cements operations to improve performance and meet standards. Many of the advantages of the present invention are apparent in the application of well cementing and completing, plugging, temporary and permanent abandonment of wells Alternatives proposed to ordinary well cements are Geopolymers. These are materials that are visco-elastic. An example of this physical property is the mixture of cornflour and water; it is hard when handled and soft when held. Another example is Bingham Plastic. This behaves like mayonnaise (soft when handled, hard when held). Neither of these products are currently reasonably priced or particularly standard friendly.

Metamorphism is the mineralogical and structural adjustment of solid rocks to physical and chemical conditions that have been imposed at depths below the near surface zones of weathering and diagenesis and which differ from conditions under which the rocks in question originated.

Inorganic materials that have pozzolanic or latent hydraulic binding effects are commonly used in cementitious materials. Hydraulicity is defined as "the property of limes and cements to set and harden under water whether derived from a naturally hydraulic lime, cement or a pozzolan". A latent hydraulic binder reacts in more slowly and due to a trigger in a particular manner in order to change the properties of the cementitious products. It will come to a full strength on its own, while very slowly. These have the purpose of either stretching the need for lime clinker in the cementitious mineral admixture, or improve the properties of the cementitious mineral admixture.

Disclosure of the State of Art With regard to the state of art, reference is made to the following patent publications: FR-2.939.429, US-2015/18905, WO-2016/094506 and US-2008/196628.

All these documents deal with cement mineral mixtures for producing concrete to defend the cement construction from a reaction with $CO_2$, named a carbonation process. Carbonation is a well-known reaction for all lime-cement mixtures and change its mineral composition from CaO (lime) to $CaCO_3$ (Calcium carbonate) and this happens naturally over time due to weathering. The magnesium silicates will also react with the $CO_2$ and the minerals formed due to carbonation will expand into gaps and cracks of the cementitious structure in order to keep the structure sealed.

In more detail, the mentioned patent FR-2.939.429 pertains to the carbonation of magnesium silicates. This is particularly relevant in the injection and sealing of reservoirs containing $CO_2$. FR-2.939.429 discloses the use of magnesium-olivine i cement/concrete mixtures for the sealing of drill wells into geological formation rock for the purpose of storing of $CO_2$ in geologic formations.

Details of a Carbonation Process

Magnesium silicates can be carbonised (e.g. altered by $CO_2$), and therefore will increase the cement-plug lifetime for the cement admixtures in wells when exposed to $CO_2$, particularly those penetrating carbon-dioxide storage (CCS) reservoirs. (FR-2.939.429). That patent shows features of the reaction of olivine with $CO_2$ producing magnesium carbonate, creating a self-healing cement in actual conditions in the well.

Below is an example of a carbonation process of the magnesium end member olivine reacting with carbon dioxide.

Carbonation:

Forsterite carbon-dioxide Magnesite quartz

The carbonation process happens naturally, where $CO_2$ reacts with forsterite.

An object of the present invention is to improve the properties of a cementitious mineral admixture by adding a pozzolanic or latent hydraulic binder that reacts through hydration i.e. with $H_2O$ and other aqueous solutions. There are a multitude of pozzolans and latent hydraulic binders used in the cementitious mineral admixtures containing lime (CaO), and water. Pozzolans includes a number of natural and manufactured materials, such as ash, slag etc. The pozzolans impart specific properties to cement. Pozzolanic cements may have superior strength at a later age and may be more resistant to weathering.

DETAILED DESCRIPTION

The present invention pertains to the pozzolanic or latent hydraulic reaction through the hydration, i.e. the reaction with water and/or aqueous solutions like seawater or other brines with magnesium silicates (divalent magnesium-iron solid solution silicates, i.e. the mineral groups olivine, orthopyroxene, amphibole, talc and serpentine). In our invention, the sealing properties and resilience of the resulting product is independent of carbonisation.

The composition of a cement additive material to improve durability of cementitious structures according to the invention is characterized in that the composition comprises an admixture of one or more of divalent metal silicates with capacity to act as a latent hydraulic binder in said composition activated by a hydration process under aqueous conditions.

According to a particular preferred embodiment, the composition includes a mixture of Portland cement and water, added olivine in a range of from 2-99% based on weight of total hydraulic solid materials (i.e. not including aggregates).

According to an essential aspect of the invention, there is disclosed application of a composition of a cement additive material as a latent hydraulic binder for cementitious mineral admixtures, mortars and concrete structures for industrial applications and for construction purposes.

Further Disclosure of the Invention, an Example

Olivine group minerals $(Mg,Fe)_2SiO_4$ are silicates with magnesium and iron as major cations, while calcium and minor elements may substitute in the divalent cation sites. While reactions between crystalline minerals and $H_2O$ are generally regarded as slow, the magnesium silicates do react even at room temperatures. Fine powders of olivine, when mixed with water may increase the pH of the water to over 9. This is the origin of the term "ultrabasic rocks" and the end-member of the reactions utilized in our invention.

The hydration reactions described here happen at the very low end of the pressure- and temperature range generally discussed in metamorphic petrology. Diagenesis, weathering and very low grade metamorphism are the main processes. In geochemical reactions, an added forcing on a reaction can be geochemical instabilities, where minerals or solutions not in equilibrium seeks to react towards a steady state. In our invention, we are utilizing anthropogenically induced geochemical instabilities to induce low, very low grade metamorphism, diagenesis and weathering. Over time, even olivine grains covered in an aqueous solution and left at room temperature will weather to alteration minerals.

Below is shown some of the reactions of end-member olivines (forsterite and fayalite) when hydrated in reaction with $H_2O$. It may occur according to these but not limited to the following reaction equations:

$$3Mg_2SiO_4 + SiO_2 + H_2O \rightarrow 2Mg_3Si_2O_5(OH)_4$$

Forsterite Quartz water Serpentine and $$2Mg_2SiO_4 + 3H_2O \rightarrow Mg_3Si_2O_5(OH) + Mg(OH)_2$$

Forsterite water Serpentine Brucite

And $$3Fe_2SiO_4 + 2H_2O \rightarrow 2Fe_3O_4 3SiO_2 + 2H_2$$

Fayalite water Magnetite aqueous silica hydrogen

The purpose of the present invention is to utilize a similar reaction pattern of magnesium silicates in hydration reactions (with water ($H_2O$) and associated aqueous solutions (e.g. brines)), in that the composition is used as enhancers in cementitious mineral admixture materials, as a pozzolan, a latent hydraulic binder, as a filler, for the use of producing amorphous silica in the latent reaction, and to provide a natural anti-fouling agent in cementitious concrete and/or mortar structures in general.

As disclosed above the present invention is a cement additive material that is a pozzolanic or latent hydraulic binder of made from magnesium silicates that improve the properties of a cementitious mineral admixture and the outcome of the products made from the admixture. Our product is a cement additive material that is a latent hydraulic binder that is activated through hydration, and is intended for cementitious mineral admixtures for the purpose of increasing the integrity of the created structures produced over time. The product may also be used for its faster, pozzolanic effects.

While a function of product that is a cement additive is that the magnesium silicate material is as a filler in the cementitious mineral admixture material, the latent hydraulic binder reaction by the magnesium silicates will at low-, very low metamorphosis, diagenesis and weathering reactions of the magnesium silicate with water form reactive products such as magnesium silicate hydrates, amorphous silica and hydrogen. These reactions and alterations the original minerals causes the reactive products to expand into gaps, pores and other pressure shadows in the cementitious structure with amorphous and crystalline alteration materials.

The minor elements of naturally occurring magnesium silicates and traces from accessory minerals, containing elements like Nickel, Zinc and Chromium may in addition improve the interactions with steel, notoriously corroded in contact with corrosive water and brines. Magnesium silicate outcrops frequently are vegetation free, and we are suggesting this is grounds to utilize magnesium silicates due to the content of minor amounts of anti-biofouling agents.

For accessory minerals, we are using the standard definition to one skilled in the art of between 0.05% and 3% by volume of rock. For the present invention, this range is preferably between 0.1% and 1%.

Adding magnesium silicate minerals to the cement or geopolymer admixture will therefore provide a long term and pesticide free way to provide anti fouling properties to cement and concrete structures. Trace minerals containing Zn, Cr and other heavy metals will appear as microscopic distinct points in a larger blend of minerals enhancing the anti-fouling properties on the cement surface while being a negligible contributor to macroscale environmental concerns.

It is known that the most used experimental olivine (San Carlos olivine) with water will metamorphose to talc ($Mg_3$, $(Si_4O_{10})(OH)_2$), and quartz minerals below 70° C. and to serpentine minerals (for example $Mg_6,(Si_4O_{10})(OH)_8$) above 70° C. while giving the water a higher pH due to the $H_2$ produced in the reaction and dissolved into water. The higher pH water is naturally and by less oxidizing to iron and steel and reduce the weathering and weakening of cement and associated structures inside and outside to the cementitious mineral admixture. Mixing materials lowers the Gibbs free energy compared to the pure end-members. The initiation of reactions will happen at lower temperatures for magnesium silicates in cementitious mineral admixtures, than for the pure end-members alone. The $\Delta T$ above initiation of reactions will influence the rate of reaction, as the rate be dependent on the temperature as described by the Arrhenius' equation. Therefore, the processes in the mixtures will speed up and/or occur at even lower temperatures than model mineral end-members. At diagenetic and very low grade metamorphism pressures and temperatures, the magnesium silicates will reduce and/or replace the need for quartz additives that prevent the growth of unwanted minerals (e.g. promoting Tobermorite in lieu of the high Ca/Si ratio phases).

Structures like road constructions or buildings for homes and offices will decay over time due to weathering and other external factors like climate, as well as due to internal structural decay. Adding magnesium silicates as a cement additive product working as a latent hydraulic binder will reduce weathering by low temperature metamorphism involving hydrous alteration of the magnesium silicates over time.

Our product will have the same outcome as crystalline quartz flour for compressive strength and permeability at higher pressures and temperatures. Alternatively, it may work like slag, which is also a latent hydraulic binder for cementitious mineral admixtures.

The latent hydraulic binder reaction by hydration without calcium in solution in this invention works by altering the minerals to secondary minerals with a lower density and therefore also a higher volume. Due to pressure-gradients on micro scales, the secondary minerals produced will seek to form in voids, pores, cavities and cracks, thereby sealing the cementitious product when it is exposed to aqueous solutions externally and internally. These are particularly important where weaknesses in the cementitious product occurred during the emplacement of the mixtures. Even during curing of the cement mineral admixture containing our cement additive material, the volume of the cementitious mineral admixture increases, compared to ordinary cementitious mineral admixtures that shrink during curing. Hydration is a major trigger for the latent hydraulic reaction of magnesium silicates, particularly for olivines. By adding magnesium silicates, the cementitious materials become self-healing when exposed to water and brines.

As the present invention expands in volume during and after curing, it allows for a better sealing against fluids as more of the available space and pores are filled with reactive materials.

Used in oil and gas wells, it improves the exposure resilience to fluids that are penetrating the structure made up by the cementitious mineral admixture, while potentially creating natural reactive bonding with the side rock and buffering the corrosion of steel in the well. Already established methods used in well maintenance and the plugging and abandonment (P&A) process today can still be enabled by use of this new latent hydraulic binder for cementitious mineral admixtures. This make it easier for the industry to take the new cementitious into use.

The olivines have a particular wetting angle being much smaller than most other solids to water, and the use of this magnesium silicate will change the adhesion of olivine-containing cementitious mineral admixtures to steel and other iron products.

This change in wetting angle ensures a better bonding to steel and iron. This is very useful during construction applications that involve reinforcing bars. It is also useful when using cement with steel tubulars such as used in the oil and gas industry. Additionally, the present invention provides a high buffer capacity; preventing the pH from changing in the face of a strong acid (or base). This prevents or reduces harm to the integrity of the steel or iron.

Our tests show that cementitious materials that have been produced with pores and fractures are filled by low temperature metamorphic minerals when the materials are exposed to water and brines.

Thus, there is provided a cement capable of binding suitable aggregate into a concrete that can set and harden underwater.

Examples of Use

The chemical properties of magnesium silicates make the mineral suitable for improvement of the outcome of cementing and plugging of wells that are drills that are trying to reach reservoirs. The minor elements of magnesium silicates and the commonly accessory minerals will improve the interactions with steel. This invention can be used for the management of wells, including, but not limited to open petroleum reservoirs, inside casing/liner/tubing/conductor, between casing/liner/tubing/conductor and geological formation, in open hole as kick-off plug for drilling/kicking off for new well path, as barrier as part of plug and abandonment, as well as permanent plug and abandonment, both conventional and by use of pert and wash technology. Invention can be used in oil producers, new and old, gas producers, new and old, water producers, new and old, injection wells, new and old, Geothermic wells, new and old, water wells, new and old or any combinations of these. Exploration well, appraisal wells, development wells will also be areas of use for invention. Well integrity problems due to degraded cement sheaths are a known cause of leaks through active and abandoned wells. Development of an improved well plugging material that hinders leakage through well plugs is likely to have major positive environmental impact, as it improves long-term well integrity and reduces leakages to the environment. Our invention, as a cement additive material added to cementitious mineral admixture materials, magnesium silicates will increase the cement-plug lifetime for the drilling, abandonment of oil and gas wells in general, but also those penetrating present or future carbon-dioxide storage reservoirs. Current practices on P&A involves massive retrieval ("pulling") of steel tubulars. This is an environmental work hazard due to the application of rotating methods (cutting/milling) that can threaten workers, all the while very costly in rig time. The reduction of steel corrosion from our product will possibly reduce the amount of steel pulling needed and enable piercing practices currently underway (so-called perforate-wash-cement). Likewise, the acoustic properties of olivine are significantly different from both the surrounding rocks, steel and mud, making logging easier if applied as an annular sealant material. The addition of the cement additive product will make ordinary wells described above safer for the future by using this invention in the cementitious material also in areas that may become CCS reservoirs, as shown by FR-2.939.429.

This invention is suitable to be used in cement, mortar and/or concrete products to reduce biofouling and corrosion of steel and iron, weathering and carbonation of the cement material (also as a part of concrete).

The corrosion of constructions were concrete containing e.g. Portland cement is widely known and is more prone to this in environment with rough weather and were exposed to $CO_2$ and salt conditions. This intervention will better resist these conditions and hence increase the lifetime of concrete constructions in general.

In ordinary Portland cement, it is a requirement that the $Cl^-$ ions (e.g. salt water) in the fluid medium added to the mixture is kept to a minimum. As such, normal seawater, and other water types containing chloride, are not used. In fact, it is normal to use de-ionized water.

Chloride ions reduce the breaking strength of ordinary cement mixtures. The chloride in the water is also known to erode and rust enforcing steel structures. This is particularly a problem when adding marine sediments as aggregates to a cement mixture. Furthermore, it is a problem when there is scarcity of fresh, low $Cl^-$ water for the mixtures.

The concrete industry may then use water that could have been used for potable water. Lastly, using ordinary Portland cement concrete structures and cemented wells in products that will be exposed to seawater and brines after hardening, e.g. harbors, spars, molos, will be prone to deconstruction from the chloride.

In our invention, we have found that the cement additive reduces the need for a low $Cl^-$ water medium as the magnesium silicates will strengthen the structures when exposed to chloride ions. This allows seawater and underground brines to be used directly without any removal of the chloride ions.

A chloride concentration of between 0.7% and 10% by weight of water would be functional, preferably between 1.2% and 5%. These are common concentrations of $Cl^-$ found in seawater and underground brines.

Additionally, the high pH of the magnesium silicates and their reactions will reduce the amount of oxidation of iron associated with the cement or concrete product. A designed variation of grain sizes will buffer the solids for longer. Furthermore, if the solids are deformed at a later stage, broken grains will be free to react with chemicals that are available in the potential flow through them. This will increase the protective effect if the final structure needs to self-heal.

Experiment #1

In an experiment, solid cementitious mineral admixture products were fabricated based on a mixture of 80% Portland cement, and 20% olivine (which is a divalent magnesium-iron solid solution silicate) by weight, and water having an ordinary W/C number (W/C=water to cement ratio). The fraction of olivine was 0.2 with denatured water added. A solid cementitious mineral admixture cylinder was prepared and flooded by a seawater analog brine for a period of eleven days. The changes of permeability was measured throughout the experiment and the porosity was evaluated before and after the experiment by using a CT scanner.

The measurements showed that porosity of the product, when applying the inventive cementitious mineral admixture was reduced by as much as 55%, and permeability went down by 70% after said just eleven days exposed to brine. The experiments show that a more dense and water resistant concrete material is achieved by the present invention.

Figure 1A:
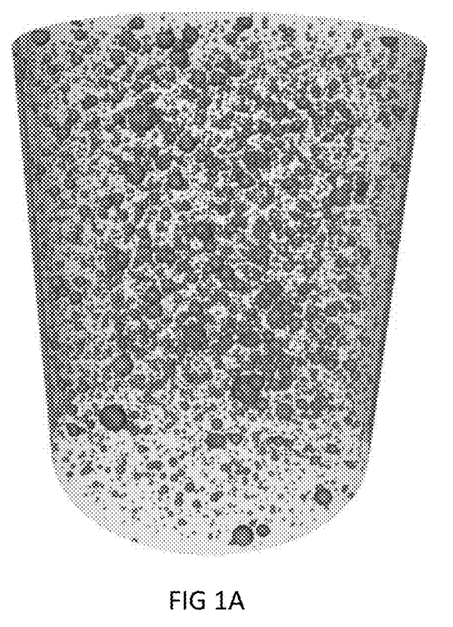
FIG. 1A discloses a CT scan of a sample before Experiment #1 was performed.
Figure 1B:
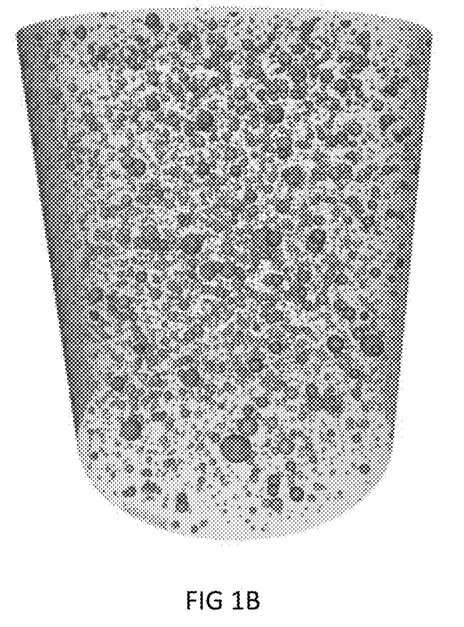
FIG. 1B discloses a CT of a sample after Experiment #1 was performed.

FIGS. 1A and 1B disclose CT scans of a sample during this experiment. The red denotes voids within the sample in both FIGS. 2A and 2B. In FIG. 2B the green shows precipitation within the voids of the sample.

Figure 1C:
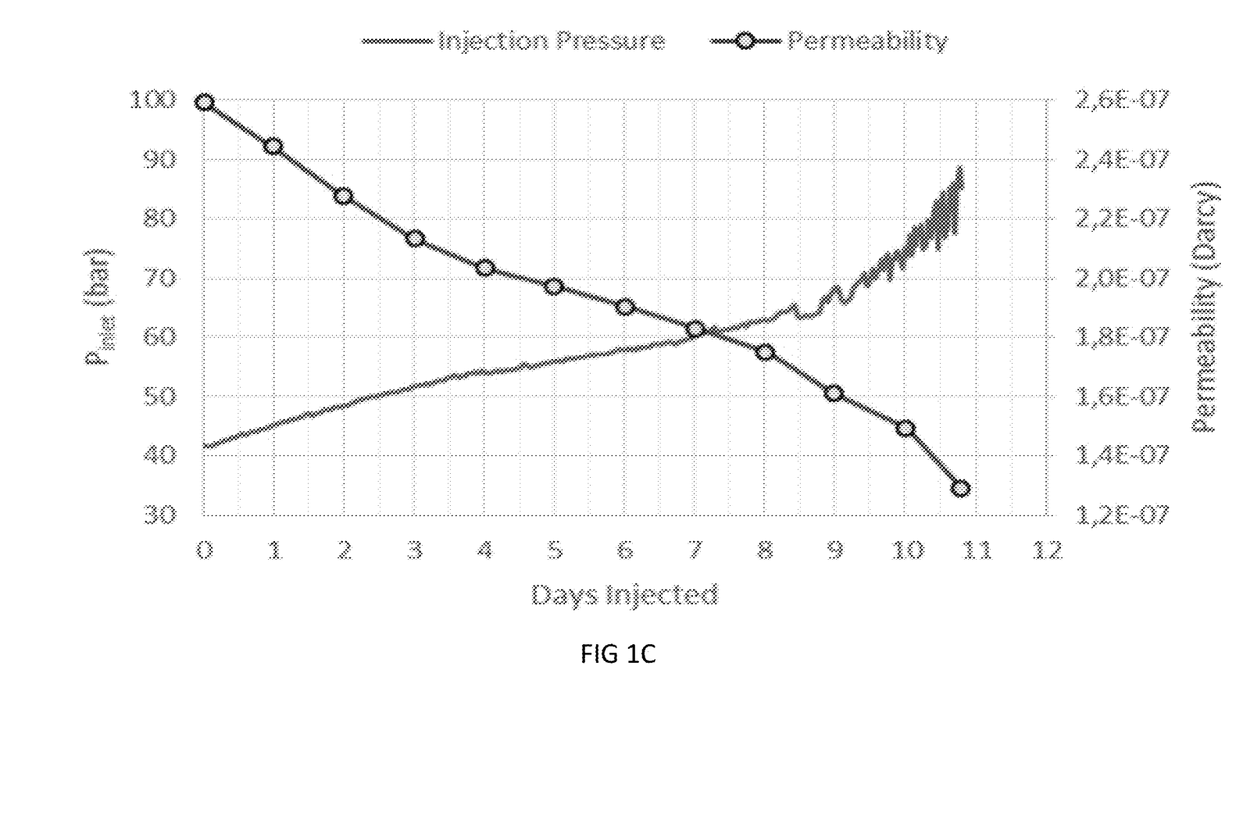
FIG. 1C discloses measurements of porosity and permeability over time during Experiment #1

FIG. 1C discloses the permeability and injection pressure as a function of time over the course of the experiment.

The measurements show that the porosity of the product was reduced by 70% and the permeability by 55%. This demonstrates the self-healing ability of the invention when exposed to seawater.

Experiment #1 show that a denser and water resistance concrete material is achieved by the present invention.

Experiment #2

In another experiment, a mixture of Portland cement and the present invention as in Experiments #1 and #2 was exposed to CO2 for a period of a week.

Figure 2A:
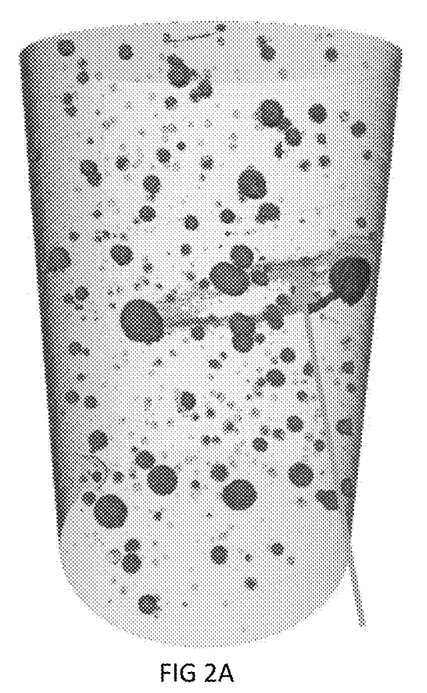
FIG. 2A discloses a CT scan of a sample before Experiment #2 was performed.
Figure 2B:
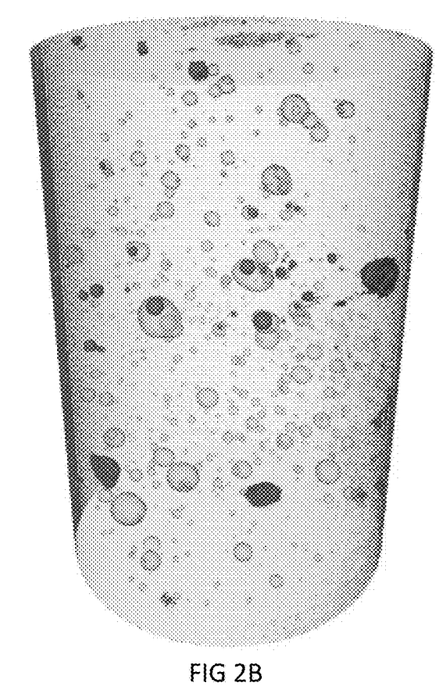
FIG. 2B discloses a CT of a sample after Experiment #2 was performed.

FIGS. 2A and 2B disclose the CT scans of before and after Experiment #3. The red denotes voids within the sample in both FIGS. 2A and 2B. The green arrow in FIG. 2A points to large number of inhomogeneities. In FIG. 2B the green shows precipitation within the voids of the sample.

Figure 2C:
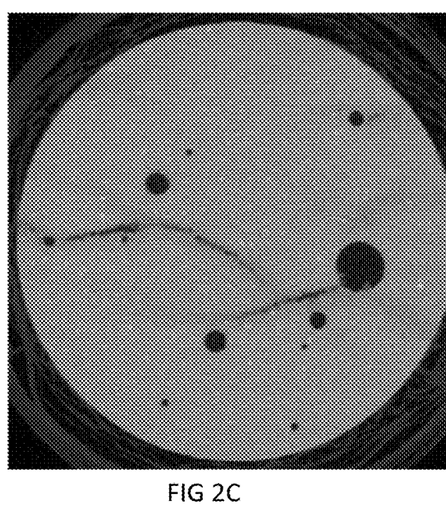
FIG. 2C discloses a CT scan of a slice of a sample before Experiment #2 was performed.
Figure 2D:
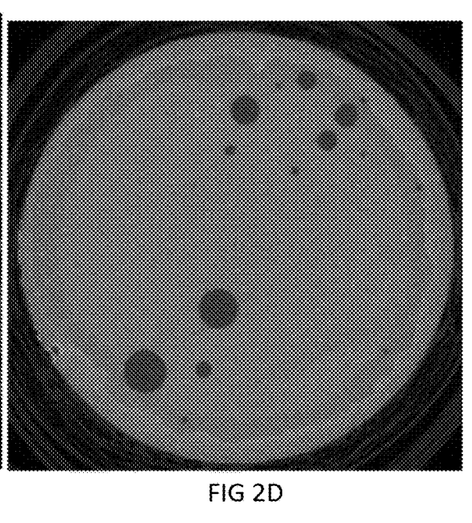
FIG. 2D discloses a CT scan of a slice of a sample after Experiment #2 was performed.

FIGS. 2C and 2D disclose CT scans of slices of the samples that are disclosed in FIGS. 2A and 2B respectively. Notice that the internal crack of FIG. 2C has been healed by the end of the experiment as shown in FIG. 2D.

Measurements showed that after exposure to $CO_2$, over 90% of the pores were healed by newly formed minerals. Additionally inhomogeneities were nearly eliminated. These affected reduce the porosity of the sample.

Experiment #3

The test the strength and properties of the invention at different additive percentages (20, 35, and 50% relative to total additive+cement) experiments was tested. A cylindrical sample was subjected to increasing amounts of compressive force to the top and bottom over a period of time. The experiment was stopped when the sample was no longer able to support the force that was applied. Each sample was cured for a period of one week before the experiment.

Figure 3:
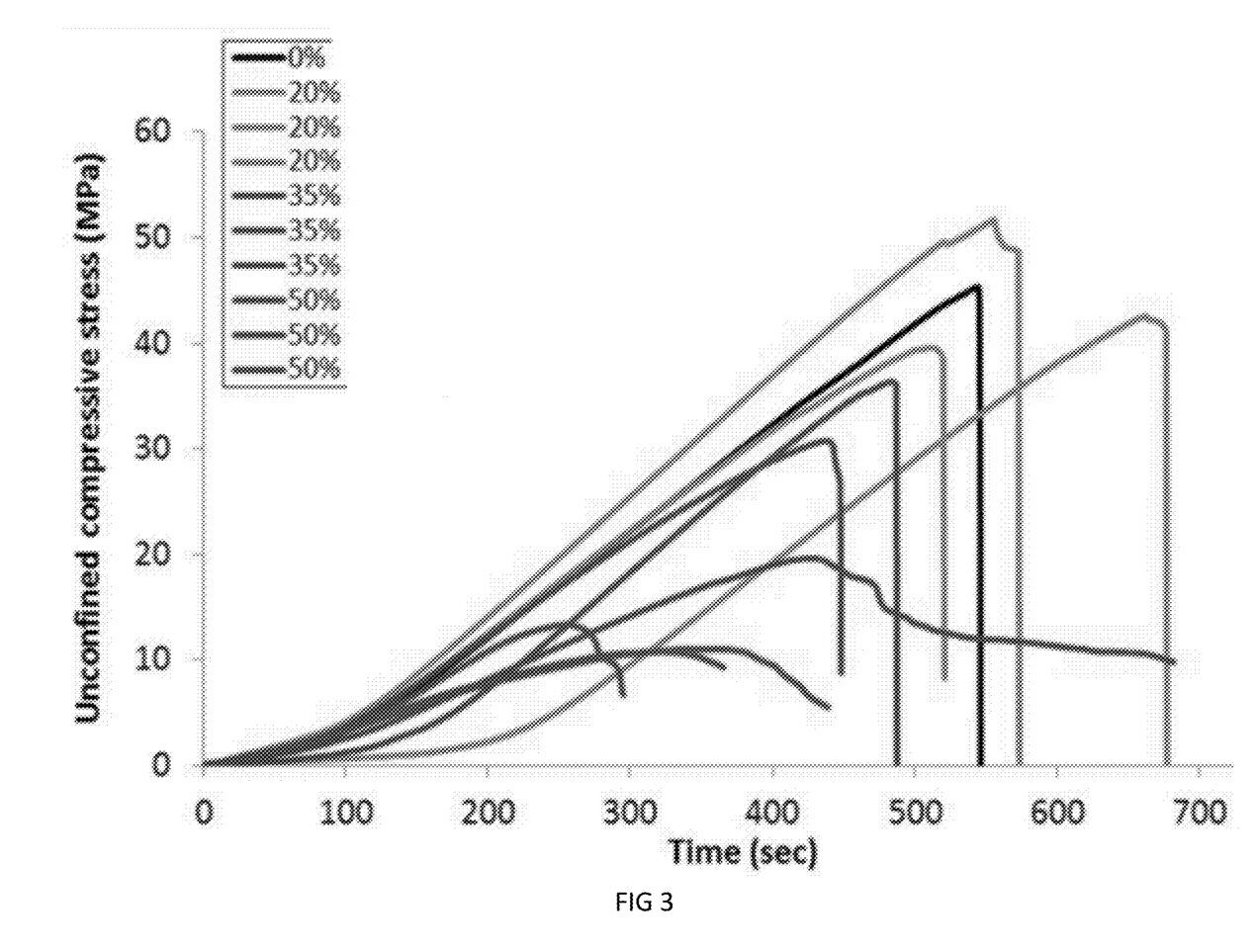
FIG. 3 discloses the compressive strength analysis of the sample of Experiment #3.

The results of this experiment is shown in FIG. 3. The 0% line (black) is regular Portland cement without the invention being added. The percentages are percent additive by percentage weight of the total cement mass. The Portland cement has a very sharp knee once it breaks. This is a sign that the Portland cement is failing in a brittle ("hard") manner. By contrast, the results with the invention have a rounded knee. This is a sign that the failure is a rupture in a brittle manner, but in a cataclastic or rolling manner. Note that each sample at a given percentage was repeated three times.

From the results of this experiment, we expect a mixture of 2-99% by weight of solids of divalent magnesium dominated silicates to be effective.

Cataclasis is here not being used or defined in a manner that is contrary to its standard meaning to one skilled in the art. Cataclasis means crushing of grains. Cataclastic flow is observed during deformation of samples containing the invention. Above the brittle-ductile transition zone is cataclastic flow the main deformation mechanism accommodating large strains. The deformation mechanism is brittle, but on a scale that make the deformation continuous and spread over a zone. This zone is observed to be broader the more magnesium silicates that were add. Hence, we find a microscopically brittle behavior that produce macroscopic ductile flow. The deformation can be regarded as a ductile mechanism, although taking place within the elastico-frictional regime of deformation. The broader this deformation zone is the more is the macroscopic ductile deformation. Cataclasis indicates that the strength of the bounding between cement grains is strong enough to allow grains to crush. Deformation is also accommodated by the sliding and rolling of fragments within the deformation zone/deformation part of the cement.

Experiment #4

In an experiment, the ordinary Portland cement, olivine and water was mixed and left to cure for one week, after which a core was extracted. The cement was left to cure for five more weeks at sixty degrees and another core was extracted. When compared, there was 50% less porosity between one week and six week curing at 60 degrees C. at 1 atm pressure. There was no change in a control sample of Portland cement without the additive of the present invention.

Final Comments

In general, the relative increase in volume when olivine turns into serpentine is 30-40%, and likewise olivine hydrated to other minerals through hydration. Therefore, each percent of magnesium silicate olivine or other divalent magnesium dominated silicate that is added to a cement mixture may increase the volume by up to 0.4% when hydrated.

It is expected that as little as 2% olivine or other divalent magnesium dominated silicate by weight can give great initial, short term, reactions in terms of early buffer capacity, limited volume compensation and some resistance to CO2 initially.

We estimate that we will need 8-12% (by weight of total hydraulic solid materials) olivine or other divalent magnesium dominated silicate to reduce the shrinkage to 0%.

Further, it is estimated that a percentage range (by weight of total hydraulic solid materials) of olivine or other divalent magnesium dominated silicate of between 2% and 99%, preferably between 10% and 99%, more preferably between 10% and 50%, most preferably between 15% and 25%, ideally about 20% will be beneficial for most uses. There will be some technical effects as before described for the cement in the wide interval of 2% to 99%. The range of 10-50% would have the best cost versus benefit, dependent on the environment, and the range of 15% to 25% will be ideal for most applications within current industrial practice.

For the ductile effects, the higher range from 35%-70% magnesium dominated silicates are preferred.

The invention claimed is:

1. A method for making cement structures with self-healing and/or antifouling properties, comprising the steps of:
    a) mixing cement with a cement additive that comprises an admixture of one or more of divalent magnesium-dominated silicates with capacity to act as a latent hydraulic binder to a cement mixture, said cement additive comprises 2% to 99% of divalent magnesium dominated silicate by weight of total hydraulic solid materials, wherein the magnesium dominated silicate is mineral groups of olivines, orthopyroxenes, amphiboles, and serpentines or mixtures thereof;
    b) adding water comprising a chloride ion concentration of between 0.7% and 10% by weight of water;
    c) blending the cement mixture to a neutral or basic slurry;
    d) making a structure from the cement mixture; and
    e) allowing the structure to set.

2. The method of claim 1, further comprising accessory sulphide and oxide minerals containing one or more of the cations nickel, zinc and chromium.

3. The method of claim 1, wherein the cement additive comprises 10% to 50% of divalent magnesium dominated silicate by weight of total hydraulic solid materials.

4. The method of claim 3, wherein the cement additive comprises 15% to 25% of divalent magnesium dominated silicate by weight of total hydraulic solid materials.

5. The method of claim 3, wherein the magnesium dominated silicate is olivine.

6. The method of claim 5, wherein the magnesium dominated silicate is olivine.

7. The method of claim 1, wherein the magnesium dominated silicate is olivine.

8. A cementitious slurry for self-healing comprising:
    a) cement;
    b) one or more divalent magnesium dominated silicates that in neutral or basic aqueous solutions have the capacity to be a latent hydraulic binder comprising 2% to 99% of divalent magnesium dominated silicate by weight of total hydraulic solid materials;
    c) wherein the magnesium dominated silicate is selected from the group of minerals consisting of olivines, orthopyroxenes, amphiboles, and serpentines, or mixtures thereof; and
    d) water with a chloride ion concentration of between 0.7% and 10% by weight.

9. The slurry of claim 8, further comprising accessory sulphide and oxide minerals containing one or more of the cations nickel, zinc and chromium.

10. The slurry of claim 8, wherein the one or more divalent magnesium dominated silicates have the capacity in neutral or basic aqueous solutions to be a latent hydraulic binder comprising 10% to 50% of divalent magnesium dominated silicate by weight of total hydraulic solid materials.

11. The slurry of claim 8, wherein the one or more divalent magnesium dominated silicates have the capacity in neutral or basic aqueous solutions to be a latent hydraulic binder comprising 15% to 25% of divalent magnesium dominated silicate by weight of total hydraulic solid materials.

12. The slurry of claim 10, wherein the magnesium dominated silicate is olivine.

13. The slurry of claim 11, wherein the magnesium dominated silicate is olivine.

14. The slurry of claim 8, wherein the magnesium dominated silicate is olivine.

\* \* \* \* \*